(12) United States Patent
Birman et al.

(10) Patent No.: US 7,665,413 B2
(45) Date of Patent: Feb. 23, 2010

(54) ILLUMINATED HUB POINTER

(75) Inventors: Vyacheslav B. Birman, Auburn Hills, MI (US); Christian Tanguy, Rochester, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 0 days.

(21) Appl. No.: 12/108,567

(22) Filed: Apr. 24, 2008

(65) Prior Publication Data

US 2008/0264328 A1    Oct. 30, 2008

Related U.S. Application Data

(60) Provisional application No. 60/926,486, filed on Apr. 27, 2007.

(51) Int. Cl.
G01D 11/28  (2006.01)
G12B 11/04  (2006.01)

(52) U.S. Cl. .................. 116/288; 116/332; 116/DIG. 6; 116/DIG. 36; 362/29

(58) Field of Classification Search .................. 116/284, 116/286–288, 305, 327, 328, 332, 62.1, DIG. 5, 116/DIG. 6, DIG. 36; 362/23, 28–30
See application file for complete search history.

(56) References Cited

U.S. PATENT DOCUMENTS

| | | | |
|---|---|---|---|
| 4,218,726 A * | 8/1980 | Fukasawa et al. ............. 362/23 |
| 4,625,262 A | 11/1986 | Sakakibara et al. | |
| 4,860,170 A * | 8/1989 | Sakakibara et al. ........... 362/26 |
| 5,003,914 A * | 4/1991 | Mayer ......................... 116/332 |
| 5,458,082 A | 10/1995 | Cookingham | |
| 5,603,283 A * | 2/1997 | Owen .......................... 116/284 |
| 6,032,608 A * | 3/2000 | Oreans et al. ................ 116/288 |
| 6,267,072 B1 * | 7/2001 | Seto et al. .................... 116/287 |
| 6,854,416 B2 * | 2/2005 | Breinich et al. ............. 116/202 |
| 6,955,438 B2 * | 10/2005 | Ishii ............................. 362/29 |
| 7,270,434 B2 * | 9/2007 | Obata et al. .................. 362/23 |
| 7,475,999 B2 * | 1/2009 | Mezouari ..................... 362/26 |
| 2005/0162843 A1 | 7/2005 | Lee et al. | |

FOREIGN PATENT DOCUMENTS

WO    WO 9916081 A1 *  4/1999

OTHER PUBLICATIONS

International Search Report and Written Opinion mailed on Oct. 23, 2008.

* cited by examiner

*Primary Examiner*—Amy Cohen Johnson

(57) ABSTRACT

A pointer assembly includes the pointer and hub that are both illuminatable. The hub includes a main portion with a concave surface. A reflector is partially received within a slot through the concave surface and is supported on top of the hub. The reflector includes a reflective surface that directs light onto the concave surface. Light from a light source is directed by separate reflective surfaces on the pointer and the reflector to illuminate both the hub and the pointer.

16 Claims, 5 Drawing Sheets

ILLUMINATED HUB POINTER

CROSS REFERENCE TO RELATED APPLICATION

The application claims priority to U.S. Provisional Application No. 60/926,486 which was filed on Apr. 27, 2007.

BACKGROUND OF THE INVENTION

This disclosure relates to an illuminated pointer for a vehicle instrument panel.

A vehicle instrument gauge or cluster includes a pointer for indicating a parameter indicative of vehicle operation or condition. The pointer may be illuminated to enhance instrument cluster appearance. The pointer is typically illuminated by directing light onto reflective surfaces within the pointer. The light can be directed through an axis or shaft into the pointer. Disadvantageously, directing light through the shaft of the pointer can create an undesired leakage of light that distracts from the desired appearance. Hubs or shrouds are utilized to block this leakage of light; however, some light remains visible.

Accordingly, it is desirable to design and develop an illuminated pointer that provides a desired appearance without appearance diminishing light leakage.

SUMMARY OF THE INVENTION

A disclosed example pointer assembly includes an illuminated hub and pointer.

The pointer assembly includes a pointer and hub that are both illuminatable. The hub includes a main portion with a concave surface. A reflector is partially received within a slot through the concave surface and is supported on top of the hub. The reflector includes a reflective surface that directs light onto the concave surface. Light from a light source is directed by reflective surfaces of the pointer and of the reflector to illuminate both the hub and the pointer.

Accordingly, the example pointer assembly provides illumination of a pointer and a concaved surface of the hub to provide a desired pointer, hub appearance combination.

These and other features of the present invention can be best understood from the following specification and drawings, the following of which is a brief description.

DETAILED DESCRIPTION OF THE PREFERRED EMBODIMENT

Figure 1:
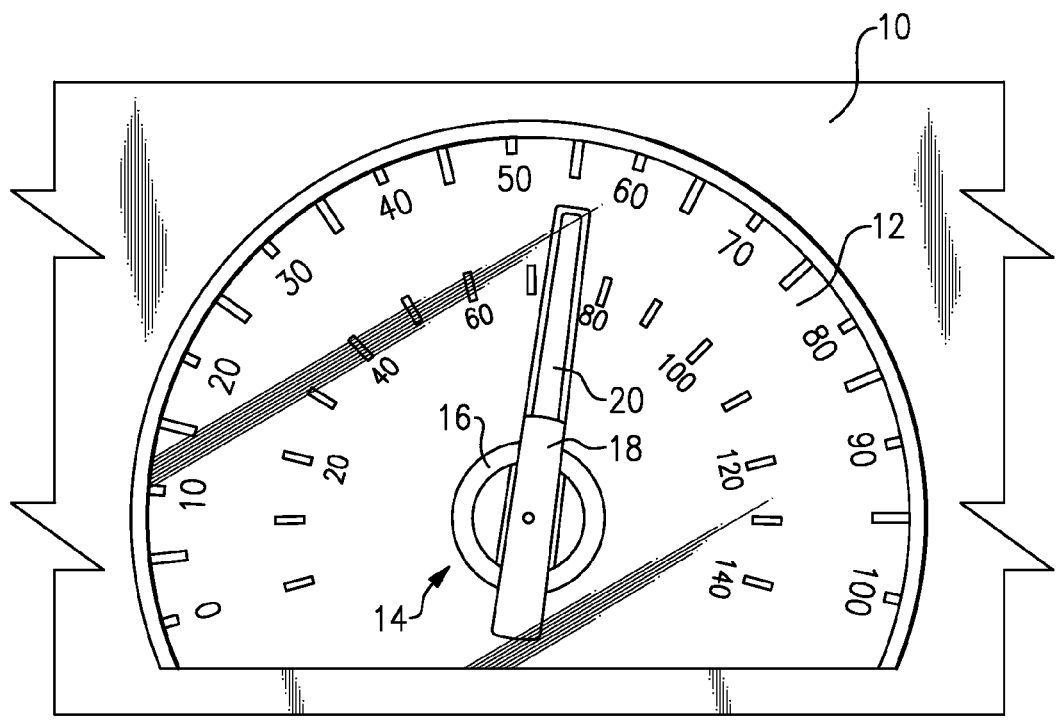
FIG. 1 is a plan view of an example instrument gauge.

Referring to FIG. 1, an instrument panel 10 includes a gauge 12 for visibly displaying a vehicle operational parameter, such as in this example vehicle speed. Other gauges providing other vehicle operating parameters such as engine speed, temperature, pressure and other desired characteristics will also benefit from this disclosure. A pointer assembly 14 moves relative to the gauge 12 and includes graduated reference indicators to visibly communicate information to a driver. The pointer assembly 14 includes a hub 16 and an illuminated pointer 20. The pointer 20 and hub 16 are both selectively illuminated to provide a desired appearance.

Figure 2:
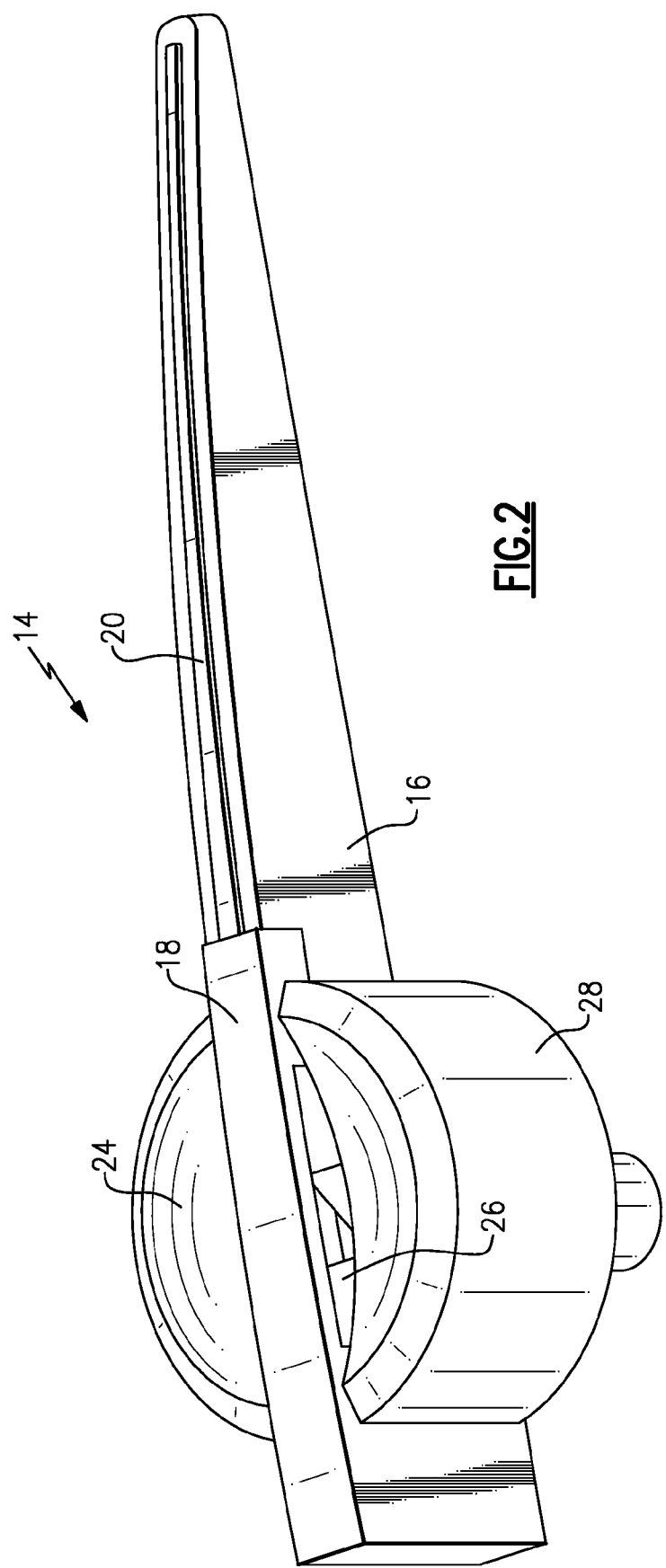
FIG. 2 is a perspective view of an example pointer assembly.
Figure 3:
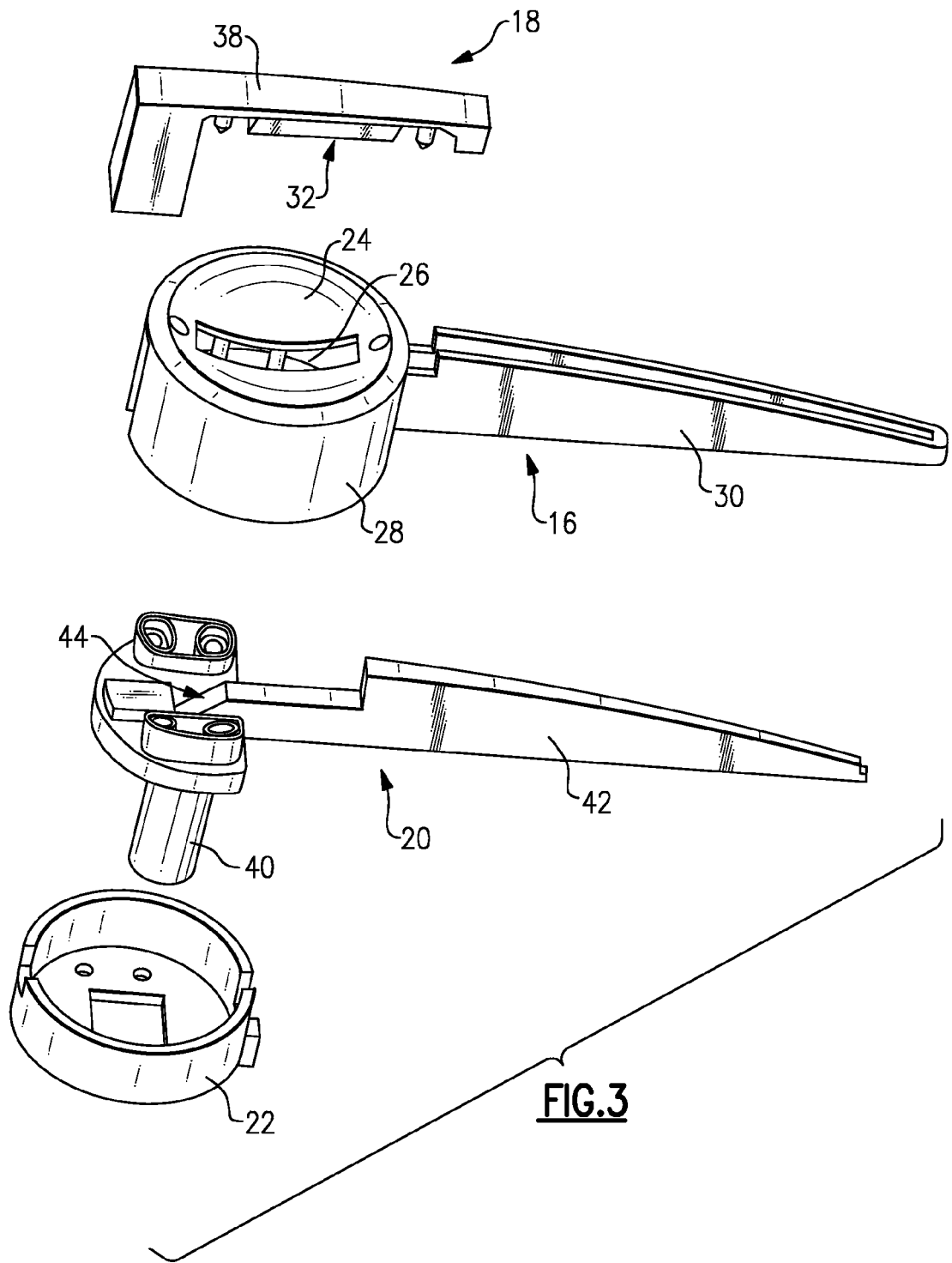
FIG. 3 is an exploded view of the example pointer assembly.

Referring to FIGS. 2 and 3, the pointer assembly 14 includes the pointer 20 and hub 24 that are both illuminatable. A lower hub 22 provides a bottom shroud to block light leakage in an undesired direction. The hub 16 includes a main portion 28 with a concave surface 24. The concave surface 24 includes a slot 26. A reflector 18 is partially received within the slot 26 and is supported on top of the main portion 28. The reflector 18 includes a first reflective surface 32 that directs light onto the concave surface 24.

The example concave surface 24 is reflective to further reflect light and provide desired illumination. The example concave surface 24 can be fabricated in any color or surface texture. Selection of the color and texture of the concave surface 24 is dependent on desired reflective properties. For example, the concave surface 24 could be fabricated with a smooth white surface to provide high reflectivity and thereby a brighter appearance. Further, the concave surface 24 may include a gray or comparable colored surface to reduce reflectivity to provide a desired appearance or contrast with the background or gauge 12. Additionally, the curvature of the concave surface 24 is selected depending on desired appearance.

The pointer 20 includes a shaft 40 that receives light from a light source disposed below. Light is communicated through the shaft 40 to a second reflective surface 44. Light is directed from the second reflective surface 44 through an arm 42. The arm 42 is thereby illuminated. The example pointer 20 can be clear, or a desired color. For example, the pointer 20 may be comprised of a blue tinted plastic to provide a desired appearance and color. Further, other colors and surface textures are desired can be utilized to coordinate the light color of the illuminated pointer 20 with a desired gauge appearance.

The hub 16 includes a shroud portion 30 that extends from the main portion 28 and partially surrounds the arm 42. The example shroud portion 30 blocks light emission from the pointer arm 42 on three sides. The top portion of the arm 42 remains visible to provide a desired appearance. The shroud portion 30 further blocks light emission through the end of the pointer arm 42. It is within the contemplation of this invention that, the example shroud portion 30 could be modified to block more or less of the pointer 20 to provide different desired visual appearances.

Figure 4:
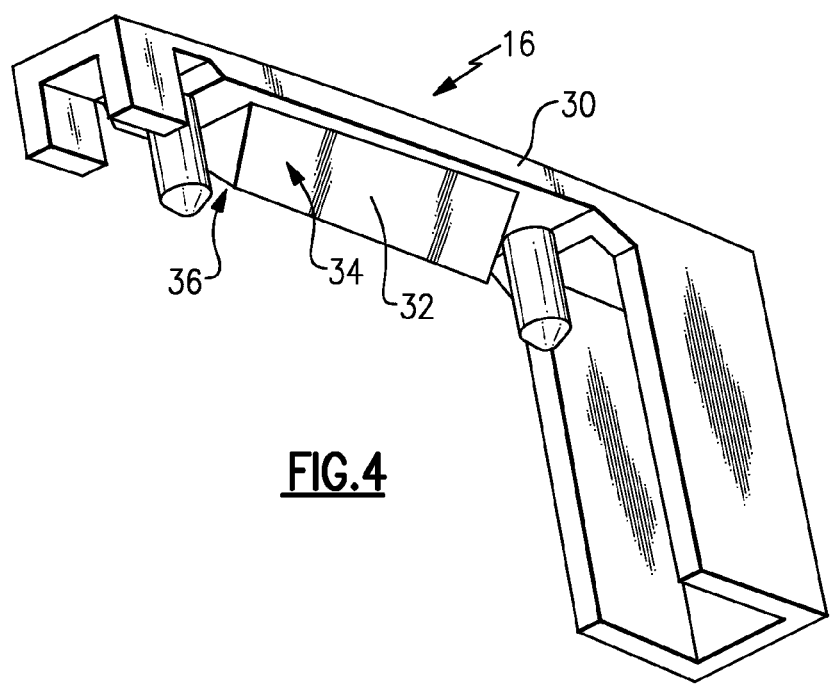
FIG. 4 is a perspective view of an example reflector.

Referring to FIG. 4, with continued reference to FIGS. 2 and 3, the reflector 18 is mounted on top of the hub 16 and includes the first reflective surface 32. The first reflective surface 32 is triangular with the sides 34 and 36 providing an angled reflective surface. The first reflective surface includes a length corresponding to a diameter of the concave surface 24. The length provides sufficient reflective surface to reflect light onto the desired portion of the concave surface 24.

The first reflective surface 32 is received within the slot 26 in the hub 16. Light communicated through the pointer shaft 40 is directed through to the arm 42. A portion of light is emitted through the second reflective surface 44 to the first reflective surface 32 of the reflector 18. Additional light can be transmitted through other surfaces of the pointer 20 onto the first reflective surface 32. The first and second sides 34, 36 are angled to direct light outward and onto the concave surface 24. The angle of the first and second sides 34, 36 is selected to reflect a desired amount of light onto the concave surface 24. Further, the surface texture and color of the first and second sides 34, 36 are provided to reflect a desired portion of light to generate a desired light intensity on the concave surface 24.

Figure 5:
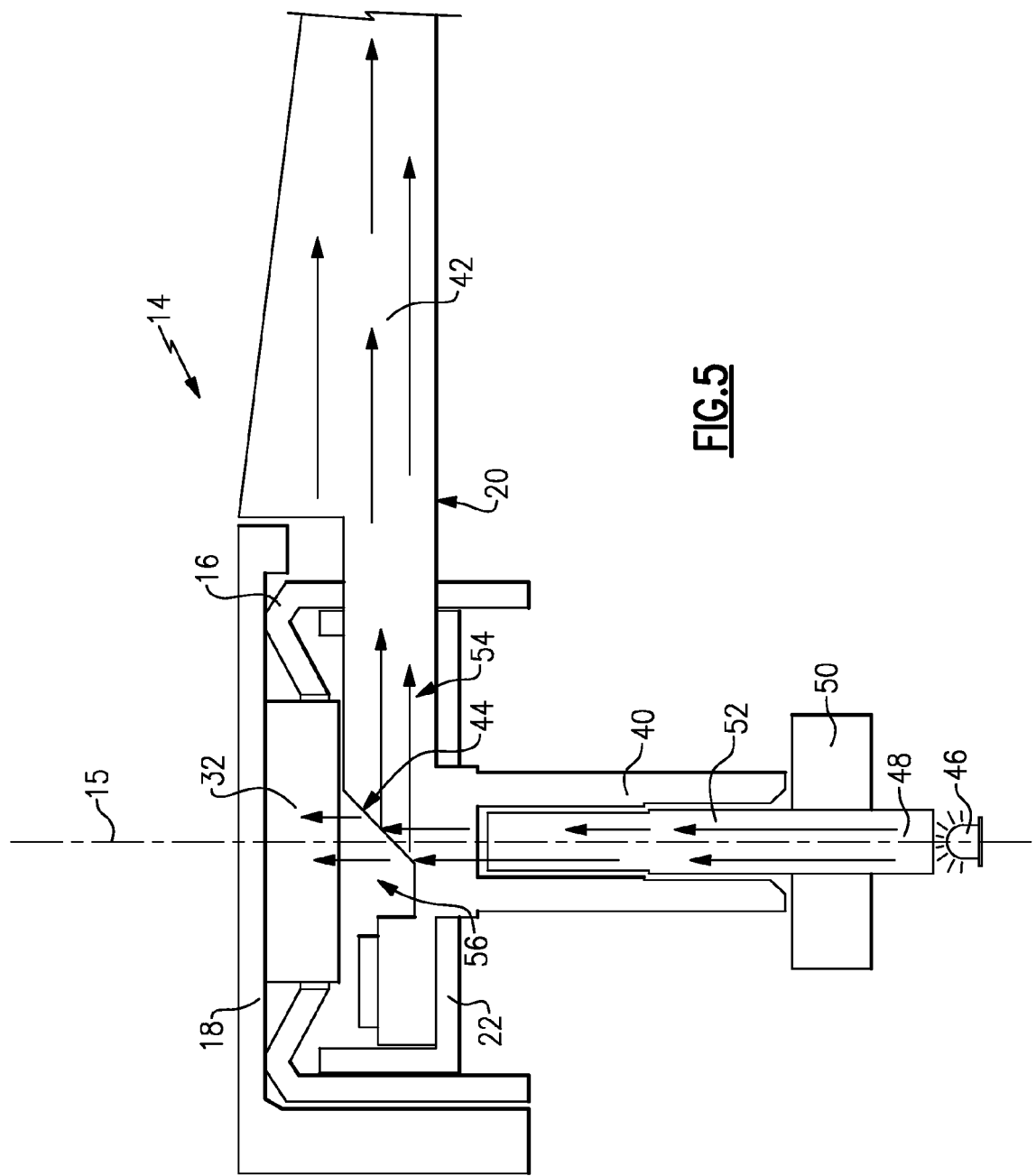
FIG. 5 is a cross-section of the example pointer assembly.
Figure 6:
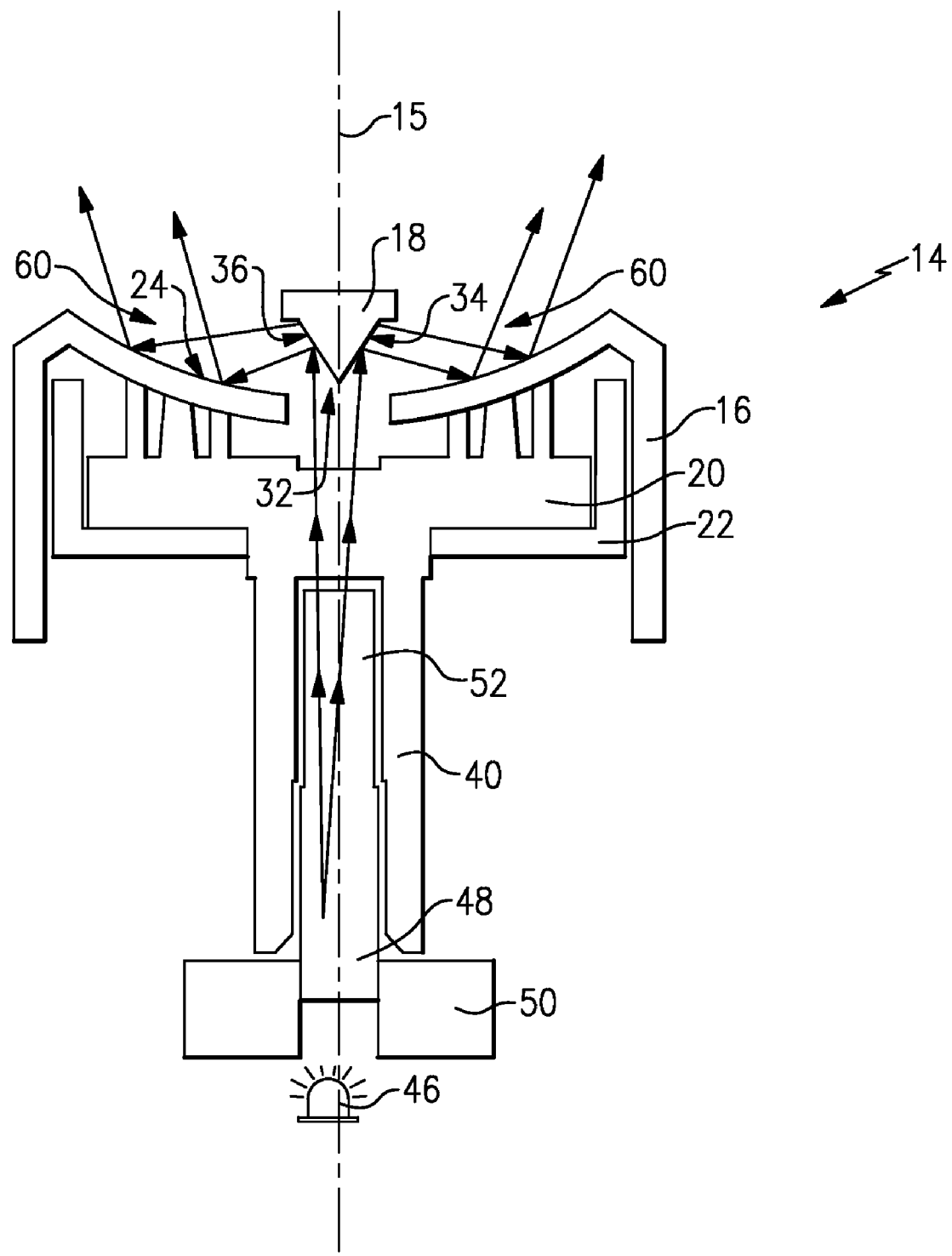
FIG. 6 is another cross-section of the example pointer assembly.

Referring to FIGS. 5 and 6, the shaft 40 of the pointer 20 is mounted to a shaft 48 for rotation about an axis 15. The shaft 48 is rotated by a drive 50. The example drive 50 is an electric stepper motor, but may be any motor or drive device. The example shaft 48 is clear and provides for the transmission of light from a light source 46. Although one light source 46 is shown, many light sources could be utilizes as are required to generate the desired light intensity. Further, although light is transmitted along the axis 15, light could be emitted and transmitted to the pointer 20 from a light source spaced apart form the axis 15.

Light, indicated by arrows 52, from the light source is transmitted through the shaft 48 parallel to the axis 15 and to the second reflective surface 44. A portion 54 of light is reflected by the second reflective surface 44 transverse to the axis and into the pointer arm 42.

Another portion of light, indicated at 56, is emitted from the second reflective surface 44 and onto the first reflective surface 32 of the reflector 18. As best shown in FIG. 6, light is reflected by the first and second sides 34, 36 of the first reflective surface 32, as indicated by arrows 60 on to the concave surface 24. The reflected light 60 is thereby further reflected and visible to provide the desired appearance. The angle of the first and second sides 34, 36 and the curvature of the concave surface 24 are selected to provide a desired intensity and quality to the light visible to a driver or operator.

Light from the light source 46 is utilized to illuminate both the concave surface 24 and the pointer 20. Light 52 transmitted along the axis 15 are reflected transversely by the second reflective surface 44 to illuminate the pointer 20. A portion of light 52 continues through the second reflective surface 44 along the axis 15 and onto the first reflective surface 32. The sides 34, 36 of the first reflective surface then direct light at a desired angle onto the concave surface 24. The example reflector 18 is not transparent and therefore light is not visible through a top surface 38. However, it is within the contemplation of this invention that the top surface 38 could be transparent so that light by be visible through the reflector 18. The color and texture of the concave surface 24 generate the desired light intensity and appearance.

The lighting effect provided by the example pointer assembly 14 includes semi-half illuminated portions of the concave surface 24, and the elongated illuminated pointer arm 42 extending radially outward from the hub 16. Accordingly, the example pointer assembly 14 provides illumination of a pointer and a concaved surface of the hub to provide a desired pointer, hub appearance combination.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An illuminated pointer assembly comprising:
    a hub including a concaved center outer surface;
    a reflector disposed over the concaved center outer surface including a first reflecting surface for reflecting light onto the concaved center cute surface; and
    a pointer including a second reflecting surface.

2. The assembly as recited in claim 1, wherein the hub includes an opening for light directed onto the first reflecting surface.

3. The assembly as recited in claim 1, wherein the first reflecting surface comprises a first side and a second side disposed at an angle for directing light onto the concaved center outer surface.

4. The assembly as recited in claim 1, wherein the pointer includes a shaft portion disposed along an axis of rotation, and a portion of the second reflecting surface is disposed over the axis of rotation.

5. The assembly as recited in claim 1, wherein the second reflecting surface emits a portion of light onto the first reflective surface.

6. The assembly as recited in claim 1, wherein the hub includes a pointer shroud surrounding a portion of the pointer.

7. The assembly as recited in claim 1, including a light source emitting light through a shaft of the pointer to the first reflecting surface and the second reflecting surface.

8. The assembly as recited in claim 7, including a drive with a clear shaft for rotating the pointer assembly about an axis.

9. An instrument assembly for a vehicle comprising:
    a gauge including graduations indicative of a vehicle operating parameter; and
    a pointer assembly movable relative to the gauge, wherein the pointer assembly includes a hub with a concave outer surface portion, a reflector disposed on top of the hub for directing light onto the concave outer surface portion and an illuminatable pointer disposed partially within the hub.

10. The assembly as recited in claim 9, wherein the pointer assembly rotates about an axis and the reflector includes a first reflective surface that intersects the axis.

11. The assembly as recited in claim 10, wherein the first reflective surface includes a first side and a second side for directing light from a light source onto the concave outer surface portion.

12. The assembly as recited in claim 10, wherein the pointer includes a second reflective surface directing light through the pointer.

13. The assembly as recited in claim 12, wherein the second reflective surface emits light through to the first reflective surface of the reflector.

14. The assembly as recited in claim 12, wherein the pointer includes an arm and a portion of light reflected by the second reflective surface illuminates the arm.

15. The assembly as recited in claim 14, wherein the hub includes a shroud portion partially surrounding the arm of the pointer.

16. The assembly as recited in claim 9 including a light source emitting light along an axis of rotation of the pointer assembly and a drive for rotating the pointer assembly relative to the gage.

* * * * *